E. R. GILL.
METHOD FOR PRESERVING EGGS.
APPLICATION FILED NOV. 10, 1914.
1,161,124. Patented Nov. 23, 1915.
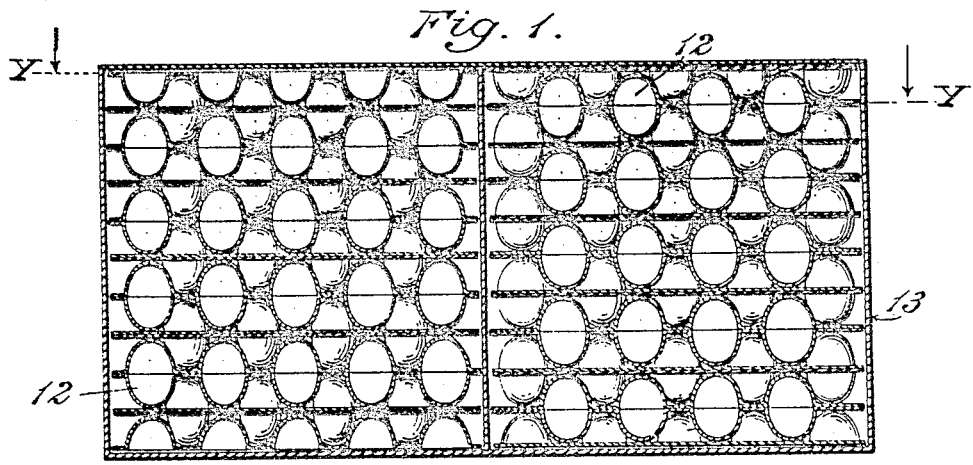
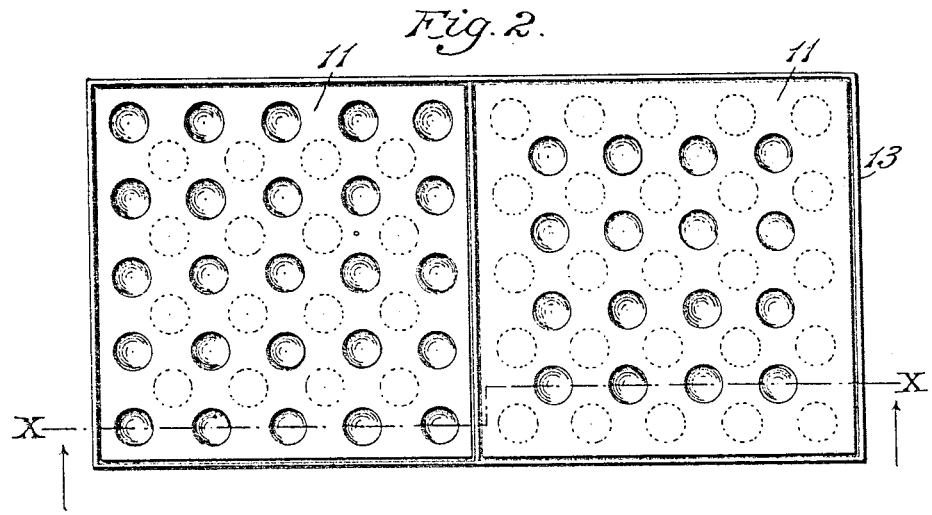
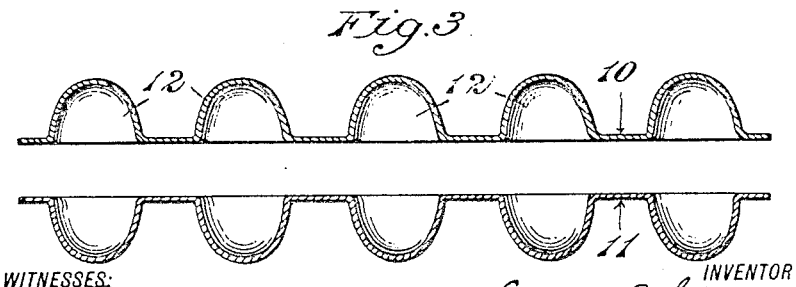

UNITED STATES PATENT OFFICE.

EDWIN R. GILL, OF YONKERS, NEW YORK.

METHOD FOR PRESERVING EGGS.

1,161,124.  Specification of Letters Patent.  Patented Nov. 23, 1915.

Original application filed July 1, 1913, Serial No. 776,773. Divided and this application filed November 10, 1914. Serial No. 871,228.

*To all whom it may concern:*

Be it known that I, EDWIN R. GILL, a citizen of the United States, residing at Yonkers, in the county of Westchester and State of New York, have invented certain new and useful Improvements in Methods for Preserving Eggs; and I do hereby declare the following to be a full, clear, and exact description of the invention, such as will enable others skilled in the art to which it appertains to make and use the same.

The present invention has relation to an improved method of packing eggs for transportation and storage with a view to their better preservation without detriment to the condition or flavor of the egg meat; while providing against breakage in travel.

It has been common hitherto to transport and store eggs in containers made of coarse paper board, which, while serving to prevent breakage in some degree, afford no protection against the access of germs. Indeed certain wrappers commonly employed, such as those made of strawboard, often carry within them such undesirable germs as are found in straw, etc. These germs, being communicated to the eggs, become a source of rot or taint. It has also been proposed to preserve eggs by packing in lime, coating with liquid glass or the like, but these methods impair the flavor and stop up the pores of the shells, while depriving the eggs of the surrounding air, which, when not germ laden, is found to be essential to keeping them in their best condition.

It is the principal object of my present invention to avoid the difficulties above mentioned and to preserve the eggs as nearly in their original natural condition as possible.

The means or apparatus employed in carrying out my method are described and claimed in my co-pending application for patent filed July 1st 1913, Serial Number 776,773, of which this application is a division.

A preferred form of envelop or container, especially useful for the safe transportation and storage of eggs and certain fruits, is illustrated in the accompanying drawing, wherein Figure 1 is a vertical section of an egg crate packed with my improved containers taken on the line x—x of Fig. 2, Fig. 2 is a horizontal section of the same on the line Y—Y of Fig. 1, and Fig. 3 is a sectional view of a small container showing the two halves separated.

It is to be understood, of course, that the form illustrated is set forth merely by way of example, as my invention is applicable to a great variety of forms of container.

The egg or fruit case shown in the drawings consists of two halves or sheets 10 and 11, as clearly shown in Fig. 3, each of which is formed with domes or pockets, 12. The entire finished container is formed by bringing two of these sheets together so that the opening of each dome or pocket in each sheet registers with the similar opening in the other sheet. Unit containers are thus formed which may be used separately or be packed together.

My invention consists in manufacturing these or other suitable containers of pulp impregnated with a suitable antiseptic or germicide. Impregnation in this manner makes it possible to use straw-board or other material otherwise frequently a source of germ taint.

I prefer to incorporate the germicide in question in the original pulp vat from which the material is taken, although this is not essential.

While a great variety of germicides will answer the purpose, I prefer such as least tend to impart any odor or flavor to the contents of the package, and I have found a strong proportion of common salt (NaCl) to be particularly adapted to this purpose.

In Figs. 1 and 2 are shown the special packing usually employed by me for shipping and storing eggs. The crates 13 are made in two divisions adapted to hold fifteen dozen in each. In order to accommodate this number in crates of this character, alternate horizontal packing units are used having respectively sixteen and twenty five cells, as shown on the two sides of Fig. 2. This arrangement caused the cells in each unit to occupy the spaces between the cells in the next unit, thus economizing space and making the strength and elasticity of the dome form available to resist breakage throughout the entire volume of the crate.

My method of packing reduces to a minimum any tendency to imparting the odor or flavor of the germicide to the contained eggs, etc., since contact between the article contained and its envelop is restricted to a relatively small area. In this respect my method is superior to coating each egg, wrapping in paper or merely packing in lime etc.

What I claim is—

The method of preserving eggs which consists in inclosing the same in their natural uncoated condition within closed cells made of material having germicidal properties, so loosely as to retain a material volume of air within each cell around the contained egg.

In testimony whereof, I affix my signature, in presence ow two witnesses.

EDWIN R. GILL.

Witnesses:
  KATHARINE C. MEAD,
  GENE A. BECKWITH.